(12) United States Patent
Tang

(10) Patent No.: US 10,728,898 B2
(45) Date of Patent: Jul. 28, 2020

(54) METHOD FOR USE IN TRANSMITTING SIGNAL, TERMINAL DEVICE, AND NETWORK DEVICE

(71) Applicant: GUANGDONG OPPO MOBILE TELECOMMUNICATIONS CORP., LTD., Dongguan, Guangdong (CN)

(72) Inventor: Hai Tang, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/483,418

(22) PCT Filed: Feb. 6, 2017

(86) PCT No.: PCT/CN2017/073002
§ 371 (c)(1),
(2) Date: Aug. 3, 2019

(87) PCT Pub. No.: WO2018/141115
PCT Pub. Date: Aug. 9, 2018

(65) Prior Publication Data
US 2020/0015213 A1    Jan. 9, 2020

(51) Int. Cl.
*H04W 74/08* (2009.01)
*H04W 72/04* (2009.01)

(52) U.S. Cl.
CPC ..... *H04W 72/046* (2013.01); *H04W 74/0833* (2013.01)

(58) Field of Classification Search
CPC .......... H04W 72/046; H04W 74/0833; H04W 36/30; H04B 7/063; H04B 7/0695
See application file for complete search history.

(56) References Cited

U.S. PATENT DOCUMENTS

| | | | |
|---|---|---|---|
| 10,091,820 B2 * | 10/2018 | Yu | ........... H04W 74/0833 |
| 10,433,335 B2 * | 10/2019 | Frenne | ........... H04L 5/0048 |
| 2013/0064129 A1 * | 3/2013 | Koivisto | ........... H04B 7/0621 370/252 |

(Continued)

FOREIGN PATENT DOCUMENTS

| | | |
|---|---|---|
| CN | 101159466 | 4/2008 |
| CN | 103004160 | 3/2013 |
| CN | 104734758 | 6/2015 |

OTHER PUBLICATIONS

WIPO, ISR for PCT/CN2017/073002, Oct. 27, 2017

(Continued)

*Primary Examiner* — Kenneth T Lam
(74) *Attorney, Agent, or Firm* — Hodgson Russ LLP

(57) ABSTRACT

Disclosed is a method for use in transmitting a signal, a terminal device, and a network device. The method includes: a terminal device receives a signal transmitted by a network device employing multiple downlink transmission beam groups; and the terminal device transmits first information to the network device, thus allowing the network device to determine a first downlink transmission beam group from the multiple downlink transmission beam groups, and at least one downlink transmission beam group of the multiple downlink transmission beam groups comprising multiple downlink transmission beams.

14 Claims, 3 Drawing Sheets

(56) References Cited

U.S. PATENT DOCUMENTS

| | | | |
|---|---|---|---|
| 2014/0010178 A1* | 1/2014 | Yu | H04W 74/0833 |
| | | | 370/329 |
| 2015/0003325 A1 | 1/2015 | Sajadieh et al. | |
| 2015/0257073 A1* | 9/2015 | Park | H04B 7/0408 |
| | | | 370/331 |
| 2015/0312864 A1* | 10/2015 | Jung | H04W 72/08 |
| | | | 455/522 |
| 2016/0219570 A1 | 7/2016 | Guo et al. | |
| 2017/0207843 A1* | 7/2017 | Jung | H04B 7/0408 |
| 2018/0352539 A1* | 12/2018 | Takano | H04J 11/00 |
| 2019/0246387 A1* | 8/2019 | Lee | H04L 5/00 |

OTHER PUBLICATIONS

EPO, Office Action for EP Application No. 17895268.5, dated Dec. 11, 2019.
EPO, Office Action for EP Application No. 17895268.5, dated May 25, 2020.

* cited by examiner

METHOD FOR USE IN TRANSMITTING SIGNAL, TERMINAL DEVICE, AND NETWORK DEVICE

CROSS-REFERENCE TO RELATED APPLICATION

This application is a U.S. national phase application of International Application No. PCT/CN2017/073002, filed Feb. 6, 2017, the entire disclosure of which is incorporated herein by reference.

TECHNICAL FIELD

The embodiments of the present application relate to the communication field, and more particularly, to a method, a terminal device, and a network device for transmitting a signal.

BACKGROUND

In a multi-beam system, a terminal device and a network device may train a plurality of beams by beamforming, and different beams may correspond to different directions and different coverage areas. Generally, the network device does not know performance of downlink transmission beams, and uses all downlink transmission beams in a system to send signals to the terminal device, resulting in a large system signaling overhead.

SUMMARY

In view of this, the embodiments of the present application provide a method, a terminal device, and a network device for transmitting a signal, which can reduce system signaling overhead.

In a first aspect, there is provided a method for transmitting a signal, including: receiving, by a terminal device, a signal sent by a network device by using a plurality of downlink transmission beam groups; and sending, by the terminal device, first information to the network device, so that the network device determines a first downlink transmission beam group from the plurality of downlink transmission beam groups, at least one of the plurality of downlink transmission beam groups including a plurality of downlink transmission beams.

Each downlink transmission beam group includes at least one downlink transmission beam. The first information may be an implicit indication or an explicit indication, the explicit indication may be indicated by several bits, and the implicit indication may make the downlink transmission beam groups correspond to transmission characteristics and feed back to the network device through a certain transmission characteristic.

In addition, a beam is physically invisible with respect to the terminal device in a system. After receiving the signal sent by the network device by a plurality of beams, the terminal device may identify difference of the beams by using difference of the signals. That is to say, the terminal device may feed back to the network device by using the transmission characteristic indicated by a certain signal, and the network device may determine the downlink transmission beam in which group is preferable according to the transmission characteristic fed back by the terminal device.

When there are a plurality of downlink transmission beams, the downlink transmission beams are grouped by the transmission characteristic, and after receiving the signals sent by the plurality of downlink transmission beams, the terminal device may select a signal with better transmission characteristic and notify the network device of the transmission characteristic adopted by the signal. After receiving the transmission characteristic, the network device may determine the corresponding downlink transmission beam group, so that the network device only uses this part of the beams to perform signal transmission later, thereby reducing the system signaling overhead.

In a possible implementation manner, the first information is a random access preamble sequence, and the random access preamble sequence and/or a physical random access channel resource used to send the random access preamble sequence correspond to the first downlink transmission beam group.

By corresponding the random access preamble sequence and/or the physical random access channel resource to the downlink transmission beam group, a partition granularity of the random access preamble sequence and/or the physical random access channel resource of each group is relatively large, thereby reducing a collision probability of random access.

The first downlink transmission beam group is indicated to the network device by using the first information, which may be directly indicated by the first information, or may be indicated by other transmission characteristic of the first information, such as occupied frequency domain resource and/or time domain resource.

In a possible implementation manner, after the terminal device sends the first information to the network device, the method further includes: sending, by the terminal device, second information to the network device, so that the network device determines a first downlink transmission beam from the plurality of downlink transmission beam groups, the first downlink transmission beam being a downlink transmission beam that is expected by the terminal device for the network device to transmit a subsequent signal.

In a possible implementation manner, the first downlink transmission beam is a beam in the first downlink transmission beam group.

Optionally, the fed back first downlink transmission beam may be a beam with the best transmission performance selected by the terminal device.

Optionally, the first downlink transmission beam may not belong to the first downlink transmission beam group. For example, after indicating the first downlink transmission beam group to the network device, the terminal device finds that the beam with the best performance belongs to other group, and then the terminal device may directly feed back the first downlink transmission beam to the network device.

A two-step indication method is used to feed back the downlink transmission beam expected by the terminal device to the network device, which can greatly reduce the signaling overhead. Moreover, by the manner in which the random access preamble sequence and/or physical random access channel resource directly indicate the beam group, the collision probability of random access may be reduced.

In a possible implementation manner, before the terminal device sends the second information to the network device, the method further includes: receiving, by the terminal device, third information sent by the network device, the third information being used to indicate whether the terminal device needs to send the second information to the network device; and according to the third information, determining, by the terminal device, whether to send the second information to the network device.

Further, the third information is carried in a random access response message sent by the network device to the terminal device, and/or the second information is carried in a message used to send an identifier of the terminal device in a random access process.

In a possible implementation manner, the second information is an identifier of a signal carried on the first downlink transmission beam received by the terminal device, and the signal carried on the first downlink transmission beam is at least one of following signals: a primary synchronization signal, a secondary synchronization signal, a broadcast signal, a reference signal, and a signal carrying a system message.

In a second aspect, there is provided a method for transmitting a signal, including: sending, by a network device, a signal to a terminal device by using a plurality of downlink transmission beam groups; receiving, by the network device, first information sent by the terminal device; and determining, by the network device, a first downlink transmission beam group from the plurality of downlink transmission beam groups according to the first information, at least one of the plurality of downlink transmission beam groups including a plurality of downlink transmission beams.

In a possible implementation manner, the first information is a random access preamble sequence, and the determining, by the network device, the first downlink transmission beam group from the plurality of downlink transmission beam groups according to the first information, includes: determining, by the network device, the first downlink transmission beam group corresponding to the random access preamble sequence from the plurality of downlink transmission beam groups, according to the random access preamble sequence, or determining, by the network device, the first downlink transmission beam group corresponding to a physical random access channel resource used to send the random access preamble sequence from the plurality of downlink transmission beam groups, according to the physical random access channel resource, or determining, by the network device, the first downlink transmission beam group corresponding to both the random access preamble sequence and a physical random access channel resource used to send the random access preamble sequence from the plurality of downlink transmission beam groups, according to the random access preamble sequence and the physical random access channel resource.

In a possible implementation manner, after the network device receives the first information sent by the terminal device, the method further includes: receiving, by the network device, second information sent by the terminal device; and determining, by the network device, the first downlink transmission beam from the plurality of downlink transmission beam groups according to the second information, the first downlink transmission beam being a downlink transmission beam that is expected by the terminal device for the network device to transmit a subsequent signal.

In a possible implementation manner, the first downlink transmission beam is a beam in the downlink transmission beam group, and the determining, by the network device, the first downlink transmission beam from the plurality of downlink transmission beam groups according to the second information, includes: determining, by the network device, the first downlink transmission beam from the first downlink transmission beam group according to the second information.

In a possible implementation manner, before the network device receives the second information sent by the terminal device, the method further includes: sending, by the network device, third information to the terminal device, the third information being used to indicate whether the terminal device needs to send the second information to the network device; and receiving, by the network device, the second information sent by the terminal device, including: receiving, by the network device, the second information sent by the terminal device according to the third information.

Further, the third information is carried in a random access response message sent by the network device to the terminal device, and/or the second information is carried in a message used to send an identifier of the terminal device in a random access process.

In a possible implementation manner, the second information is an identifier of a signal carried on the first downlink transmission beam received by the terminal device, and the signal carried on the first downlink transmission beam is at least one of following signals: a primary synchronization signal, a secondary synchronization signal, a broadcast signal, a reference signal, and a signal carrying a system message.

In a third aspect, there is provided a terminal device for performing the method in the first aspect or any of possible implementations of the first aspect. In particular, the terminal device includes a unit for performing the method in the first aspect or any of the possible implementations of the first aspect.

In a fourth aspect, there is provided a network device for performing the method in the second aspect or any of possible implementations of the first aspect. In particular, the terminal device includes a unit for performing the method in the second aspect or any of the possible implementations of the second aspect.

In a fifth aspect, there is provided a terminal device. The terminal device includes: a memory, a processor, an input interface, and an output interface. The memory, the processor, the input interface, and the output interface are connected by a bus system. The memory is used for storing instructions, and the processor is used to perform the instructions stored in the memory, so as to perform the method in the first aspect or any of the possible implementations of the first aspect described above.

In a sixth aspect, there is provided a network device. The network device includes: a memory, a processor, an input interface, and an output interface. The memory, the processor, the input interface, and the output interface are connected by a bus system. The memory is used for storing instructions, and the processor is used to perform the instructions stored in the memory, so as to perform the method in the second aspect or any of the possible implementations of the second aspect described above.

In a seventh aspect, there is provided a computer storage medium, for storing computer software instructions used for performing the method in the first aspect or any of the possible implementations of the first aspect described above, or the method in the second aspect or any of the possible implementations of the second aspect described above, including a program designed to perform the above aspects.

These and other aspects of the present application will be more concise and understandable from description of following embodiments.

DETAILED DESCRIPTION

Figure 1:
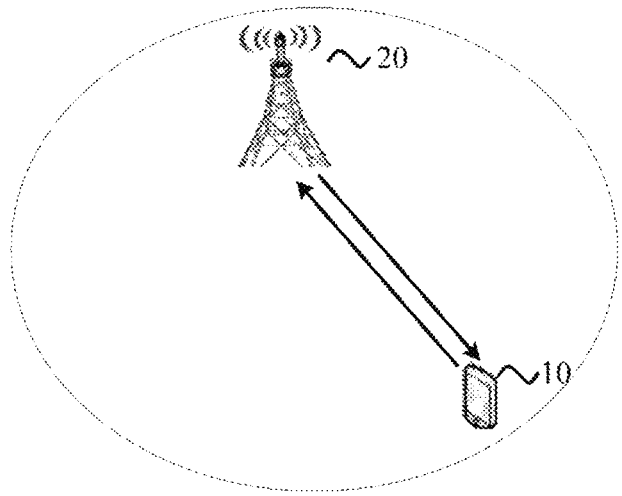
FIG. 1 shows a schematic diagram of an application scenario according to an embodiment of the present application.

Technical solutions in embodiments of the present application will be clearly and completely described below with reference to drawings in the embodiments of the present application.

It should be understood that the technical solutions in the embodiments of the present application may be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or future 5G system, and the like.

In particular, the technical solutions in the embodiments of the present application may be applied to various communication systems based on non-orthogonal multiple access technology, such as Sparse Code Multiple Access (SCMA) system, Low Density Signature (LDS) system, and the like, and the SCMA system and the LDS system may also be referred to as other names in the field of communication; further, the technical solutions in the embodiments of the present application may be applied to a multi-carrier transmission system adopting a non-orthogonal multiple access technology, for example, Orthogonal Frequency Division Multiplexing (OFDM), Filter Bank Multi-Carrier (FBMC), Generalized Frequency Division Multiplexing (GFDM), Filtered-OFDM (F-OFDM) system, and the like adopting the non-orthogonal multiple access technology.

The terminal device in the embodiments of the present application may refer to User Equipment (UE), an access terminal, a user unit, a user station, a mobile station, a mobile platform, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device with wireless communication capability, a computing device or other processing devices connected to a wireless modem, an in-vehicle device, a wearable device, a terminal device in a future 5G network or a terminal device in future Public Land Mobile Network (PLMN), and the like, which is not limited in the embodiments of the present application.

The network device in the embodiments of the present application may be a device for communicating with a terminal device. The network device may be a Base Transceiver Station (BTS) in GSM or CDMA, or may be a NodeB (NB) in a WCDMA system, or may be an Evolutional NodeB (eNB or eNodeB) in the LTE system, or may be a wireless controller in a Cloud Radio Access Network (CRAN) scenario, or the network device may be a relay station, an access point, an in-vehicle device, a wearable device, a network device in a future 5G network or a network device in a future evolved PLMN network, and the like, which is not limited in the embodiments of the present application.

FIG. 1 is a schematic diagram showing an application scenario according to an embodiment of the present application. A communication system in FIG. 1 may include a terminal device 10 and a network device 20. The network device 20 is configured to provide communication service for the terminal device 10 and access a core network. The terminal device 10 accesses the network by searching for a synchronization signal, a broadcast signal, and the like sent by the network device 20, thereby performing communication with the network. The arrows shown in FIG. 1 may represent uplink/downlink transmissions by a cellular link between the terminal device 10 and the network device 20.

The communication system in FIG. 1 may adopt multi-beam technology. Specifically, for a downlink, the network device may have a plurality of Downlink Transmit Beams (DL Tx Beam), and the terminal device may have a plurality of Downlink Receive Beams (DL Rx Beam); and for a uplink, the terminal device may have a plurality of Uplink Transmit Beams (UL Tx Beam), and the network device may have a plurality of Uplink Receive Beams (UL Rx Beam).

Generally, since the network device does not know which downlink transmission beams have better performance, in order to improve gain of the signal, the network device uses each downlink transmission beam of all downlink transmission beams to send a downlink signal to the terminal device. For example, the network device may send D1 downlink signals to the terminal device by using D1 downlink transmit beams, and the terminal device may receive D1 downlink signals by using D1 downlink receive beams. As a result, the overhead of system signaling is relatively large, especially in the case where the number of downlink transmission beams is large.

Figure 2:
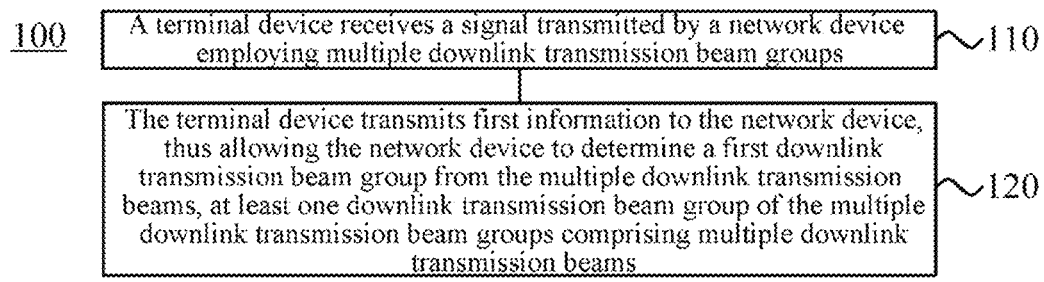
FIG. 2 shows a schematic block diagram of a random access method according to an embodiment of the present application.

Specifically, FIG. 2 shows a schematic block diagram of a random access method 100 according to an embodiment of the present application. The method 100 may be applied to the wireless communication system shown in FIG. 1, which is not limited in the embodiments of the present application. The method 100 includes the following steps.

In step S110, a terminal device receives a signal sent by a network device by using a plurality of downlink transmission beam groups.

In step S120, the terminal device sends first information to the network device, so that the network device determines a first downlink transmission beam group from the plurality of downlink transmission beam groups, at least one of the plurality of downlink transmission beam groups including a plurality of downlink transmission beams.

Specifically, in order to reduce the overhead of system signaling, all the downlink transmission beams may be grouped, and the terminal device may select a better downlink transmission beam by measuring signals of all received downlink transmission beams, and feed back to the network device by using transmission characteristic corresponding to the downlink transmission beam, so that the network device may determine which group of downlink transmission beams the terminal expects for according to the received transmission characteristic, and may only use a part of the downlink transmission beams for signal transmission later, which reduces the overhead of system signaling.

It should be understood that a beam is physically invisible to the terminal device in a system. After receiving the signal sent by the network device by a plurality of beams, the terminal device may identify difference of the beams by using difference of signals. That is to say, the terminal device may feed back to the network device by using the transmission characteristic indicated by a certain signal, and the network device may determine which downlink transmission beam group is preferable according to the transmission characteristic fed back by the terminal device.

Optionally, the network device may group the downlink transmission beams in the system according to certain criteria, such as the number of terminal devices in different downlink transmission beams, and the grouped downlink transmission beams may be recorded as a beam group 1, a beam group 2 . . . and a beam group N, where, each beam group may include one or more downlink transmission beams. After receiving the signal sent by the network device according to the plurality of beams, the terminal device may select one or more signals by measurement, for example, the selected signal may be a signal with better performance, and the terminal device indicates the selected beam group to the network device by using the transmission characteristic indicated by the signal. For example, the terminal device may receive a system message that is sent by using the plurality of beams, and each system message indicates a random access preamble sequence corresponding to the adopted beam, where, if the random access preamble sequences corresponding to the beams in the same beam group are the same, the terminal device may initiate random access to the network device according to the random access preamble sequence indicated by the selected signal. The network device may determine which beam group has better performance according to the received random access preamble sequence, and use this beam group as a reference to send a subsequent signal to the terminal device.

It should be understood that the random access preamble sequence only serves as an identifier of the beam group, and other transmission characteristics may also be used. Those skilled in the art understand that several bits may be used to explicitly indicate the selected beam group, and the number of the bits is related to the number of the beam groups. For example, if there are 8 beam groups, then 3 bits may be used to indicate the beam groups, for example, it is possible to configure 000 as a beam group 0, configure 0001 as a beam group 1, and so on. The foregoing is merely an example, and the embodiments of the present application are not limited thereto.

Optionally, in the embodiments of the present application, the first information is a random access preamble sequence, and the random access preamble sequence and/or a physical random access channel resource used to send the random access preamble sequence correspond to the first downlink transmission beam group.

Specifically, the network device may send the system message to the terminal device by using a plurality of downlink transmission beams, and the system messages carried on the beams of the same beam group may indicate the same random access preamble sequence and/or the same physical random access channel resource. Similarly, system messages carried on beams of different beam groups may indicate different random access preamble sequences and/or different physical random access channel resources. Next, the terminal device initiates random access to the network device by using a random access preamble sequence and/or a physical random access channel resource indicated by the system message carried on the selected downlink transmission beam. The network device may determine, according to received random access preamble sequence or received physical random access channel resource, which one of the downlink transmission beam groups is selected by the terminal device.

Figure 3:
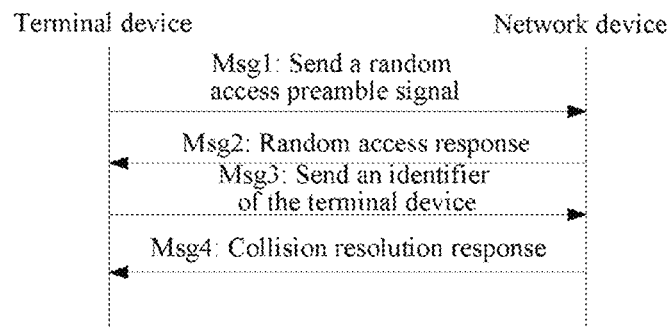
FIG. 3 shows a flowchart of a random access process.

The random access technology is the primary content of communication between a terminal and a network in a mobile communication system. In a wireless cellular network, the terminal initiates a connection request to the network through a random access process. For ease of understanding, the random access process will be briefly described below with reference to FIG. 3. As shown in FIG. 3, the random access process mainly includes following contents.

Msg1, the first is sending a random access preamble signal. The main purpose is that the network device may correctly estimate a transmission delay of the terminal device, and solve a conflict problem that a plurality of terminal devices simultaneously initiate the access request.

Msg2, feedback information sent by the network device to the terminal may include the transmission delay required for uplink synchronization and an access overload condition of the current system. In addition, the network device also feeds back the uplink resource location allocated to the accessed terminal device to the terminal.

Msg3, the terminal device may send its own Cell Radio Network Temporary Identifier (C-RNTI) on the designated uplink resource.

Msg4, the network device feeds back conflict resolution information to the terminal device terminal. At this point, the random access process may completely solve the conflict problem caused by a multi-terminal device requesting to access the system at the same time.

In the case that the number of downlink transmission beams is small, the network device may group the random access preamble sequence and/or the physical random access channel resource according to the number of downlink transmission beams. The random access preamble sequence and/or the physical random access channel resource indicated by the system message transmitted on different downlink transmission beams are different. If the terminal device recommends a certain downlink transmission beam, random access is performed according to the corresponding indication. For example, a corresponding random access preamble sequence is sent to the network device or the corresponding physical random access channel resource is used to send the random access preamble sequence, that is, the network device may completely determine the downlink transmission beam selected by the terminal device through Msg1 in FIG. 3.

In the case that the number of downlink transmission beams is large, if the foregoing division manner is adopted, the division granularity of the random access preamble sequence and/or the physical random access channel resource is small, which may cause an increase in random access collision. In order to reduce the probability of the random access collision, the network device groups the random access preamble sequence and/or the physical random access channel resource according to the number of divided downlink transmission beam groups, the random access preamble sequence and/or the physical random access channel resources indicated by the system message transmitted on different downlink transmission beam groups are different, and the random access preamble sequence and/or the physical random access channel resource indicated by the system message transmitted on the beam of the same downlink transmission beam group are the same. Similarly, if the terminal device recommends a certain downlink transmission beam, random access is performed according to its corresponding indication. For example, a corresponding random access preamble sequence is sent to the network device or the corresponding physical random access channel resource is used to send the random access preamble sequence, that is, the network device may determine the downlink transmission beam group selected by the terminal device through Msg1 in FIG. 3.

Further, after the terminal device sends the first information to the network device, the method further includes: sending, by the terminal device, second information to the network device, so that the network device determines a first downlink transmission beam from the plurality of downlink transmission beam groups, the first downlink transmission beam being a downlink transmission beam that is expected by the terminal device for the network device to transmit a subsequent signal.

After the terminal device indicates the selected certain downlink transmission beam group to the network device, the terminal device may carry information indicating the certain downlink transmission beam selected by the terminal device in the next uplink message. Those skilled in the art understand that several bits may be used to explicitly indicate a certain downlink transmission beam. It should be understood that the selected certain downlink transmission beam here may be a beam in one of the selected certain downlink transmission beam groups, or may be a beam in another beam group. For example, after the terminal device indicates the first downlink transmission beam group to the network device, the terminal device may move to another place, and the terminal device may find that the beam in other groups may be better, therefore, the terminal device may directly feed back to the network device related information of the selected downlink transmission beam, and the network device may directly determine the downlink transmission beam according to the related information of the downlink transmission beam selected by the terminal device. If the terminal device feeds back a specific downlink transmission beam to the network device, the downlink transmission beam is still a better beam that was selected before, and the terminal device may further send the identifier of the beam in the downlink transmission beam group that was selected before to the network device. The identifier may also be an identifier in the plurality of beams received before by the downlink transmission beam selected by the terminal device. For example, the terminal device may receive D2 downlink signals sent by the network device through D2 downlink transmission beams before initiating the random access, and if the terminal device selects a better downlink signal in the D2 downlink signals, the terminal device may directly feed back the identifier of the selected downlink signal to the network device.

It should be understood that the foregoing downlink signal may be a primary synchronization signal, a secondary synchronization signal, a broadcast signal, a reference signal, a signal carrying a system message, or some other new signals, or may be a combination of various signals, which is not limited in the embodiments of the present application.

It should also be understood that the second information may be carried in the Msg3 of FIG. 3, or may be carried in any uplink message after the random access succeeds. If the second information is carried in the Msg3 in FIG. 3, the network device may also send a random access response message to the terminal device by adopting all or part of the beams in the first downlink transmission beam group recommended by the terminal device, and after receiving the random access response message, the terminal device may further send the Msg3 to the network device, the Msg3 carrying the second information.

Specifically, after receiving the first information sent by the terminal device, the network device may further send third information to the terminal device, the third information specifically indicating whether the terminal device needs to send the second information. For example, one bit may be carried in a certain downlink message after the random access, where 0 may mean that the second information needs to be sent, and 1 may mean that the second information does not need to be sent. It is described only in this example, which is not limited in the embodiments of the present application.

Optionally, the third information may be carried in the Msg2 in FIG. 3, that is, in a random access response message.

It should also be understood that the downlink transmission beam group and the downlink transmission beam indicated by the terminal device are only used as a reference for sending signals by the network device, and the network device does not necessarily send signals by using the downlink transmission beam group or the downlink transmission beam selected by the terminal device. In addition, after determining a certain downlink transmission beam group, the network device may not require the terminal device to further feed back the downlink transmission beam with the best performance in the downlink transmission beam group, and may directly adopt all or part of the beams in the group for downlink transmission.

Figure 4:
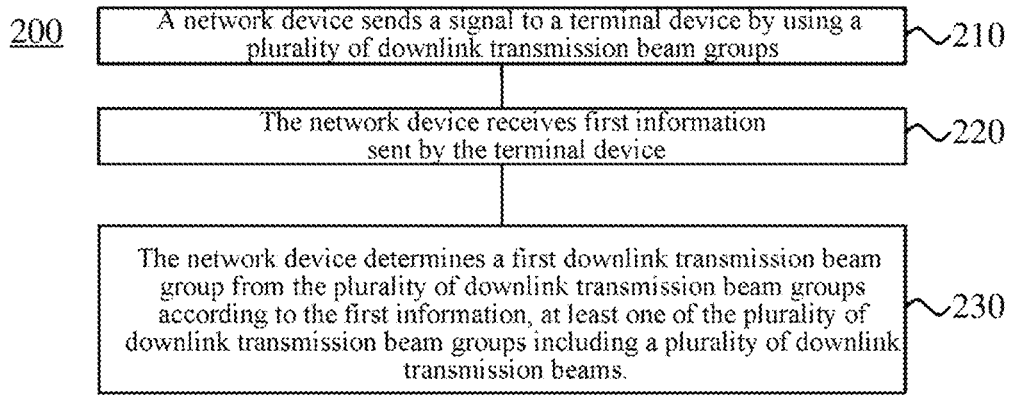
FIG. 4 shows another schematic block diagram of a method for transmitting a signal according to an embodiment of the present application.

FIG. 4 shows a schematic block diagram of a method 200 for transmitting a signal according to an embodiment of the present application. The method 200 may be applied to the wireless communication system shown in FIG. 1, which is not limited in the embodiments of the present application. The method 200 includes following steps.

In step 210, a network device sends a signal to a terminal device by using a plurality of downlink transmission beam groups.

In step 220, the network device receives first information sent by the terminal device.

In step 230, the network device determines a first downlink transmission beam group from the plurality of downlink transmission beam groups according to the first information, at least one of the plurality of downlink transmission beam groups including a plurality of downlink transmission beams.

Therefore, the method for transmitting a signal in the embodiments of the present application can reduce system signaling overhead.

Optionally, in the embodiments of the present application, the first information is a preamble sequence of random access (a random access preamble sequence), the determining, by the network device, the first downlink transmission beam group from the plurality of downlink transmission beam groups according to the first information, includes: determining, by the network device, the first downlink transmission beam group corresponding to the preamble sequence of random access from the plurality of downlink transmission beam groups, according to the preamble sequence of random access, or determining, by the network device, the first downlink transmission beam group corresponding to a channel resource of physical random access (a physical random access channel resource) used to send the preamble sequence of random access from the plurality of downlink transmission beam groups, according to the channel resource of physical random access, or determining, by the network device, the first downlink transmission beam group corresponding to both the preamble sequence of random access and the channel resource of physical random access used to send the preamble sequence of random access from the plurality of downlink transmission beam groups, according to the preamble sequence of random access and the channel resource of physical random access.

In the case that the number of downlink transmission beams is large, the network device groups the random access preamble sequence and/or the physical random access channel resource according to the number of divided downlink transmission beam groups, the random access preamble sequence and/or the physical random access channel resources indicated by the system message transmitted on different downlink transmission beam groups are different, and the random access preamble sequence and/or the physical random access channel resource indicated by the system message transmitted on the beam of the same downlink transmission beam group are the same. Therefore, the probability of random access collision can be reduced.

Optionally, in the embodiments of the present application, after the network device receives the first information sent by the terminal device, the method further includes: receiving, by the network device, second information sent by the terminal device; and determining, by the network device, the first downlink transmission beam from the plurality of downlink transmission beam groups according to the second information, the first downlink transmission beam being a downlink transmission beam that is expected by the terminal device for the network device to transmit a subsequent signal.

Optionally, in the embodiments of the present application, the first downlink transmission beam is a beam in the downlink transmission beam group, and the determining, by the network device, the first downlink transmission beam from the plurality of downlink transmission beam groups according to the second information, includes: determining, by the network device, the first downlink transmission beam from the first downlink transmission beam group according to the first information and the second information.

Optionally, in the embodiments of the present application, before the network device receives the second information sent by the terminal device, the method further includes: sending, by the network device, third information to the terminal device, the third information being used to indicate whether the terminal needs to send the second information to the network device; and receiving, by the network device, the second information sent by the terminal device, includes: receiving, by the network device, the second information sent by the terminal device according to the third information.

Optionally, in the embodiments of the present application, the third information is carried in a response message of random access (a random access response message) sent by the network device to the terminal device, and/or the second information is carried in a message used to send an identifier of the terminal device in a random access process.

Optionally, in the embodiments of the present application, the second information is an identifier of a signal carried on the first downlink transmission beam received by the terminal device, and the signal carried on the first downlink transmission beam is at least one of following signals: a primary synchronization signal, a secondary synchronization signal, a broadcast signal, a reference signal, and a signal carrying a system message.

It should be understood that the interaction between the network device and the terminal device and related features, functions, and the like described at the network device correspond to related features and functions of the terminal device. That is, the network device receives the information that the terminal device sends to the network device. It will not be elaborated herein for brevity.

It should also be understood that in various embodiments of the present application, the size of sequence numbers of above processes does not imply a sequence of execution orders, and the order of execution of the processes should be determined by its function and internal logic, which is not limited in implementation process of the embodiments of the present application.

The method for transmitting a signal according to the embodiments of the present application is described in detail above. An apparatus for transmitting a signal according to the embodiments of the present application will be described below with reference to FIG. 5 to FIG. 8, and the technical features described in the method embodiments are applicable to following apparatus embodiments.

Figure 5:
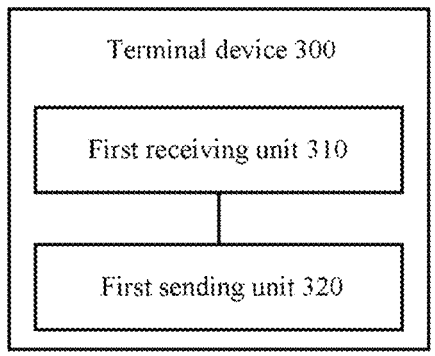
FIG. 5 shows a schematic block diagram of a terminal device for transmitting a signal according to an embodiment of the present application.

FIG. 5 shows a schematic block diagram of a terminal device 300 for transmitting a signal according to an embodiment of the present application. As is shown in FIG. 5, the terminal device 300 includes a first receiving unit 310 and a first sending unit 320.

The first receiving unit 310 is configured to receive a signal sent by a network device by using a plurality of downlink transmission beam groups;

The first sending unit 320 is configured to first information to the network device, so that the network device determines a first downlink transmission beam group from the plurality of downlink transmission beam groups, at least one of the plurality of downlink transmission beam groups including a plurality of downlink transmission beams.

Therefore, the terminal device for transmitting a signal in the embodiments of the present application can reduce the system signaling overhead.

Optionally, in the embodiments of the present application, the first information is a preamble sequence of random access, and the preamble sequence of random access and/or channel resource of physical random access used to send the preamble sequence of random access correspond to the first downlink transmission beam group.

Optionally, in the embodiments of the present application, the terminal device 300 further includes: a second sending unit 330, configured to send second information to the network device, so that the network device determines a first downlink transmission beam from the plurality of downlink transmission beam groups, the first downlink transmission beam being a downlink transmission beam that is expected by the terminal device for the network device to transmit a subsequent signal.

Optionally, in the embodiments of the present application, the first downlink transmission beam is a beam in the first downlink transmission beam group.

Optionally, in the embodiments of the present application, the terminal device further includes: a second receiving unit 340, configured to receive third information sent by the network device, the third information being used to indicate whether the terminal device needs to send the second information to the network device; and a determining unit 350, configured to determine, according to the third information, whether to send the second information to the network device.

Optionally, in the embodiments of the present application, the third information is carried in a random access response message sent by the network device to the terminal device, and/or the second information is carried in a message used to send an identifier of the terminal device in a random access process.

Optionally, in the embodiments of the present application, the second information is an identifier of a signal carried on the first downlink transmission beam received by the terminal device, and the signal carried on the first downlink transmission beam is at least one of following signals: a primary synchronization signal, a secondary synchronization signal, a broadcast signal, a reference signal, and a signal carrying a system message.

It should be understood that the terminal device 300 for transmitting the signal according to the embodiments of the present application may correspond to the terminal device in the method embodiments of the present application, and the foregoing and other operations and/or functions of respective units in the terminal device 300 are respectively used for implementing the corresponding processes of the terminal device in the method 100 shown in FIG. 2 and FIG. 3, and it will not be elaborated herein again for brevity.

Figure 6:
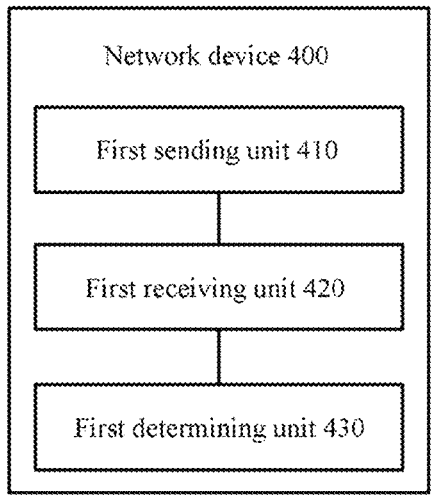
FIG. 6 shows a schematic block diagram of a network device for transmitting a signal according to an embodiment of the present application.

FIG. 6 shows a schematic block diagram of a network device 400 for transmitting a signal according to an embodiment of the present application. As shown in FIG. 6, the network device 400 includes: a first sending unit 410, a first receiving unit 420, and a first determining unit 430.

The first sending unit 410 is configured to send a signal to a terminal device by using a plurality of downlink transmission beam groups.

The first receiving unit 420 is configured to receive first information sent by the terminal device.

The first determining unit 430 is configured to determine a first downlink transmission beam group from the plurality of downlink transmission beam groups according to the first information, at least one of the plurality of downlink transmission beam groups including a plurality of downlink transmission beams.

Therefore, the terminal device for transmitting a signal in the embodiments of the present application can reduce the system signaling overhead.

Optionally, in the embodiments of the present application, the first information is a random access preamble sequence, and the first determining unit 430 is specifically configured to: determine the first downlink transmission beam group corresponding to the random access preamble sequence from the plurality of downlink transmission beam groups, according to the random access preamble sequence, or determine the first downlink transmission beam group corresponding to a physical random access channel resource used to send the random access preamble sequence, according to the physical random access channel resource, or determine the first downlink transmission beam group corresponding to both the random access preamble sequence and the physical random access channel resource used to send the random access preamble sequence, according to the random access preamble sequence and the physical random access channel resource.

Optionally, in the embodiments of the present application, the network device 400 further includes: a second receiving unit 440, configured to receive second information sent by the terminal device, the second information being used to indicate the first downlink transmission beam in the plurality of downlink transmission beam groups, the first downlink transmission beam being a downlink transmission beam that is expected by the terminal device for the network device to transmit a subsequent signal; and a second determining unit 450, configured to determine the first downlink transmission beam from the plurality of downlink transmission beam groups according to the second information.

Optionally, in the embodiments of the present application, the first downlink transmission beam is a beam in the downlink transmission beam group, and the second determining unit 450 is specifically configured to: determine the first downlink transmission beam from the first downlink transmission beam group according to the second information.

Optionally, in the embodiments of the present application, the network device 400 further includes: a second sending unit 460, configured to send third information to the terminal device, the third information being used to indicate whether the terminal device needs to send the second information to the network device; and the second receiving unit 440 is specifically configured to: receive the second information sent by the terminal device according to the third information.

Optionally, in the embodiments of the present application, the third information is carried in a random access response message sent by the network device to the terminal device, and/or the second information is carried in a message used to send an identifier of the terminal device in a random access process.

Optionally, in the embodiments of the present application, the second information is an identifier of a signal carried on the first downlink transmission beam received by the terminal device, and the signal carried on the first downlink transmission beam is at least one of following signals: a primary synchronization signal, a secondary synchronization signal, a broadcast signal, a reference signal, and a signal carrying a system message.

It should be understood that the network device 400 for transmitting the signal according to the embodiments of the present application may correspond to the network device in the method embodiments of the present application, and the foregoing and other operations and/or functions of respective units in the network device 400 are respectively used for implementing the corresponding processes of the network device in the method 200 shown in FIG. 4, and it will not be elaborated herein again for brevity.

Figure 7:
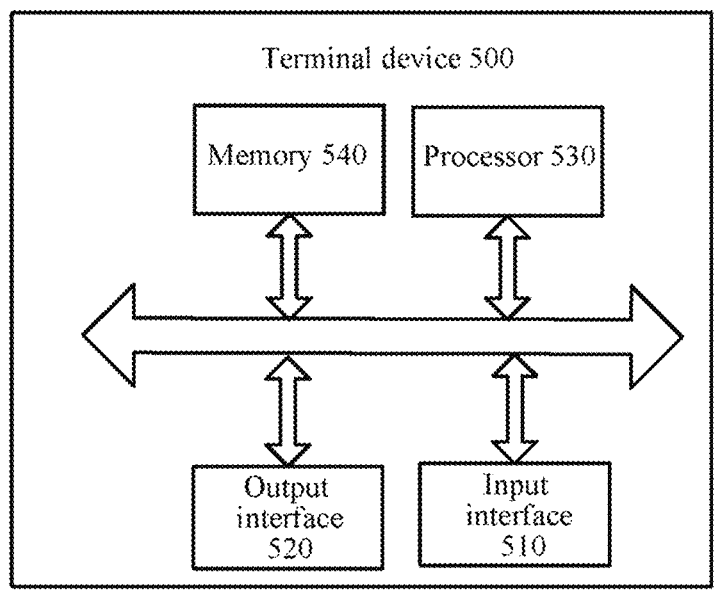
FIG. 7 shows another schematic block diagram of a terminal device for transmitting a signal according to an embodiment of the present application.

As is shown in FIG. 7, there is further provided a terminal device 500 for transmitting a signal in the embodiment of the present application. The terminal device 500 may be the terminal device 300 in FIG. 3 that may be used to execute the contents of the terminal device corresponding to the method 100 in FIG. 2. The terminal device 500 includes an input interface 510, an output interface 520, a processor 530, and a memory 540. The input interface 510, the output interface 520, the processor 530, and the memory 540 may be connected by a bus system. The memory 540 is configured to store programs, instructions or codes. The processor 530 is configured to execute the programs, the instructions or the codes in the memory 540 to control the input interface 510 to receive a signal, control the output interface 520 to send a signal, and complete operations in the foregoing method embodiments.

Therefore, the terminal device for transmitting a signal in the embodiments of the present application can reduce the system signaling overhead.

It should be understood that, in the embodiments of the present application, the processor 530 may be a Central Processing Unit (CPU), and the processor 530 may also be other general purpose processors, Digital Signal Processor (DSP), Application Specific Integrated Circuit (ASIC), Field-Programmable Gate Array (FPGA) or other programmable logic devices, discrete gate or transistor logic devices, discrete hardware components, and the like. The general purpose processor may be a microprocessor, any conventional processor or the like.

The memory 540 may include read-only memory and random access memory, and provides instructions and data to the processor 530. A portion of the memory 540 may also include a non-volatile random access memory. For example, the memory 540 may also store information of a type of a device.

In implementation process, each content of the foregoing method may be completed by an integrated logic circuit of hardware or an instruction in a form of software in the processor 530. The content of the method disclosed in the embodiments of the present application may be directly implemented by a hardware processor, or may be performed by a combination of hardware and software modules in the processor. The software module may be located in a conventional storage medium, such as a random access memory, a flash memory, a read only memory, a programmable read only memory or an electrically erasable programmable memory, a register, and the like. The storage medium is located in the memory 540, and the processor 530 reads the information in the memory 540 and combines the hardware to complete the content of the above method. To avoid repetition, it will not be elaborated here.

In a specific implementation, the first receiving unit 310 and the second receiving unit 340 in the terminal device 300 may be implemented by the input interface 510 in FIG. 7, and the first sending unit 320 and the second sending unit 330 in the terminal device 300 may be implemented by the output interface 520 in FIG. 7, and the determining unit 350 in the terminal device 300 may be implemented by the processor 530 in FIG. 7.

Figure 8:
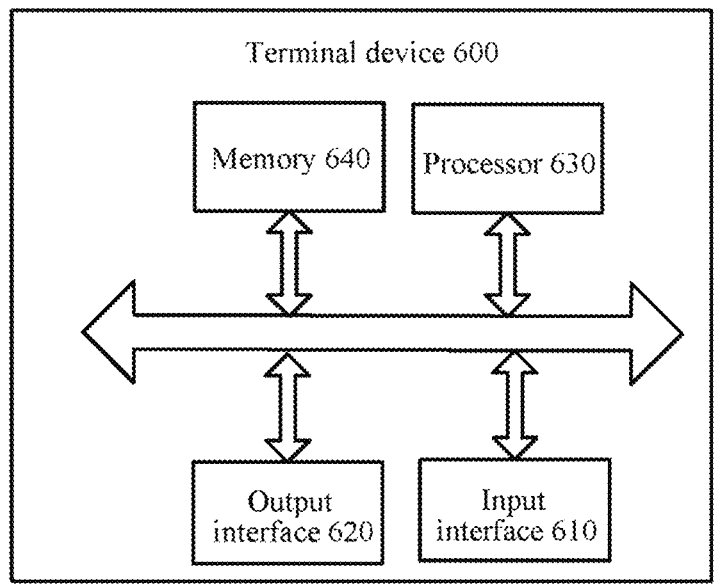
FIG. 8 shows another schematic block diagram of a network device for transmitting a signal according to an embodiment of the present application.

As is shown in FIG. 8, there is further provided a network device 600 for transmitting a signal in the embodiment of the present application. The network device 600 may be the network device 400 in FIG. 4 that may be used to execute the content of the network device corresponding to the method 200 in FIG. 4. The network device 600 includes an input interface 610, an output interface 620, a processor 630, and a memory 640. The input interface 610, the output interface 620, the processor 630, and the memory 640 may be connected by a bus system. The memory 640 is configured to store programs, instructions or codes. The processor 630 is configured to execute programs, instructions or codes in the memory 640 to control the input interface 610 to receive a signal, control the output interface 620 to send a signal, and complete operations in the foregoing method embodiments.

Therefore, the network device for transmitting a signal in the embodiments of the present application can reduce the system signaling overhead.

It should be understood that, in the embodiments of the present application, the processor 630 may be a Central Processing Unit (CPU), and the processor 630 may also be other general purpose processors, Digital Signal Processor (DSP), Application Specific Integrated Circuit (ASIC), Field-Programmable Gate Array (FPGA) or other programmable logic devices, discrete gate or transistor logic devices, discrete hardware components, and the like. The general purpose processor may be a microprocessor, any conventional processor or the like.

The memory 640 may include read-only memory and random access memory, and provides instructions and data to the processor 630. A portion of the memory 640 may also include a non-volatile random access memory. For example, the memory 640 may also store information of a type of a device.

In implementation process, the content of the foregoing method may be completed by an integrated logic circuit of hardware or an instruction in a form of software in the processor 630. The content of the method disclosed in the embodiments of the present application may be directly implemented by a hardware processor, or may be performed by a combination of hardware and software modules in the processor. The software module may be located in a conventional storage medium, such as a random access memory, a flash memory, a read only memory, a programmable read only memory or an electrically erasable programmable memory, a register, and the like. The storage medium is located in the memory 640, and the processor 630 reads the information in the memory 640 and combines the hardware to complete the content of the above method. To avoid repetition, it will not be elaborated here.

In a specific implementation, the first determining unit 430 and the second determining unit 450 in the network device 400 may be implemented by the processor 630 in FIG. 8, and the first sending unit 410 and the second sending unit 460 may be implemented by the output interface 620 in FIG. 8, and the first receiving unit 420 and the second receiving unit 440 may be implemented by the input interface 610 in FIG. 8.

Those of ordinary skills in the art may be aware that, the units and algorithm steps in individual examples described in combination with the embodiments described in the present disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by those skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed systems, apparatuses and methods may be implemented in other ways. For example, the apparatus embodiments described above are merely illustrative. For example, the division of the units is only a kind of logical function division. In practice, other division manner may be used. For example, a plurality of units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, may be located in one place, or may be distributed on a plurality of network units. Some or all of the units may be selected according to actual needs to achieve the objectives of the solutions in the embodiments.

In addition, each functional unit in each embodiment of the present application may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present application, or the part contributing to the prior art or all or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present application. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely detailed embodiments of the present application, but the protection scope of the present application is not limited thereto. Any person skilled in the art can easily think of changes or substitutions within the technical scope of the present application, and all the changes or substitutions should be covered by the protection scope of the present application. Therefore, the protection scope of the present application should be subjected to the protection scope of the claims.

What is claimed is:

1. A method for transmitting a signal, comprising:
   receiving, by a terminal device, a signal sent by a network device by using a plurality of downlink transmission beam groups; and
   sending, by the terminal device, first information to the network device, so that the network device determines a first downlink transmission beam group from the plurality of downlink transmission beam groups, at least one of the plurality of downlink transmission beam groups comprising a plurality of downlink transmission beams,
   wherein, after sending, by the terminal device, the first information to the network device, the method further comprises:
   sending, by the terminal device, second information to the network device, so that the network device determines a first downlink transmission beam from the plurality of downlink transmission beam groups, the first downlink transmission beam being a downlink transmission beam that is expected by the terminal device for the network device to transmit a subsequent signal,
   wherein, before sending, by the terminal device, the second information to the network device, the method further comprises:
   receiving, by the terminal device, third information sent by the network device, the third information being used to indicate whether the terminal device needs to send the second information to the network device; and
   determining, by the terminal device, whether to send the second information to the network device according to the third information.

2. The method according to claim 1, wherein, the first information is a random access preamble sequence, and at least one of the random access preamble sequence and a physical random access channel resource used to send the random access preamble sequence corresponds to the first downlink transmission beam group.

3. The method according to claim 1, wherein, the first downlink transmission beam is a beam in the first downlink transmission beam group.

4. The method according to claim 1, wherein, the third information is carried in a random access response message sent by the network device to the terminal device, or the second information is carried in a message used to send an identifier of the terminal device in a random access process, or the third information is carried in a random access response message sent by the network device to the terminal device and the second information is carried in a message used to send an identifier of the terminal device in a random access process.

5. A terminal device for transmitting a signal, comprising:
   a memory for storing instructions;
   a processor for performing the instructions stored in the memory;
   an input interface; and
   an output interface,
   wherein the memory, the processor, the input interface, and the output interface are connected by a bus system, and the processor is configured to:
   receive, via the input interface, a signal sent by a network device by using a plurality of downlink transmission beam groups; and
   send, via the output interface, first information to the network device, so that the network device determines a first downlink transmission beam group from the plurality of downlink transmission beam groups, at least one of the plurality of downlink transmission beam groups comprising a plurality of downlink transmission beams,
   wherein the processor is further configured to:
   send, via the output interface, second information to the network device, so that the network device determines a first downlink transmission beam from the plurality of downlink transmission beam groups, the first downlink transmission beam being a downlink transmission beam that is expected by the terminal device for the network device to transmit a subsequent signal,
   wherein the processor is further configured to:
   receive, via the input interface, third information sent by the network device, the third information being used to indicate whether the terminal device needs to send the second information to the network device; and
   determine whether to send the second information to the network device according to the third information.

6. The terminal device according to claim 5, wherein, the first information is a random access preamble sequence, and at least one of the random access preamble sequence and a physical random access channel resource used to send the random access preamble sequence corresponds to the first downlink transmission beam group.

7. The terminal device according to claim 5, wherein, the first downlink transmission beam is a beam in the first downlink transmission beam group.

8. The terminal device according to claim 5, wherein, the third information is carried in a random access response message sent by the network device to the terminal device, or the second information is carried in a message used to send an identifier of the terminal device in a random access process, or the third information is carried in a random access response message sent by the network device to the terminal device and the second information is carried in a message used to send an identifier of the terminal device in a random access process.

9. The terminal device according to claim 5, wherein, the second information is a signal identifier carried on the first downlink transmission beam received by the terminal device, and the signal carried on the first downlink transmission beam is at least one of following signals: a primary synchronization signal, a secondary synchronization signal, a broadcast signal, a reference signal, and a signal carrying a system message.

10. A network device for transmitting a signal, comprising:
    a memory for storing instructions;
    a processor for performing the instructions stored in the memory;
    an input interface; and
    an output interface,
    wherein the memory, the processor, the input interface, and the output interface are connected by a bus system, and the processor is configured to:
    send, via the output interface, a signal to a terminal device by using a plurality of downlink transmission beam groups;
    receive, via the input interface, first information sent by the terminal device; and
    determine a first downlink transmission beam group from the plurality of downlink transmission beam groups according to the first information, at least one of the plurality of downlink transmission beam groups comprising a plurality of downlink transmission beams,
    wherein the processor is further configured to :
    receive, via the input interface, second information sent by the terminal device; and
    determine the first downlink transmission beam from the plurality of downlink transmission beam groups according to the second information, the first downlink transmission beam being a downlink transmission beam that is expected by the terminal device for the network device to transmit a subsequent signal,
    wherein the processor is further configured to:
    send, via the output interface, third information to the terminal device, the third information being used to indicate whether the terminal device needs to send the second information to the network device; and
    receive, via the input interface, the second information sent by the terminal device according to the third information.

11. The network device according to claim 10, wherein, the first information is a random access preamble sequence, and the processor is configured to perform one of the following:
    determine the first downlink transmission beam group corresponding to the random access preamble sequence from the plurality of downlink transmission beam groups, according to the random access preamble sequence;
    determine the first downlink transmission beam group corresponding to a physical random access channel resource used to send the random access preamble sequence, according to the physical random access channel resource; and
    determine the first downlink transmission beam group corresponding to both the random access preamble sequence and a physical random access channel resource used to send the random access preamble sequence, according to the random access preamble sequence and the physical random access channel resource.

12. The network device according to claim 10, wherein, the first downlink transmission beam is a beam in the downlink transmission beam group, and the processor is configured to:
    determine the first downlink transmission beam from the first downlink transmission beam group according to the second information.

13. The network device according to claim 10, wherein, the third information is carried in a random access response message sent by the network device to the terminal device, or the second information is carried in a message used to send an identifier of the terminal device in a random access process, or the third information is carried in a random access response message sent by the network device to the terminal device and the second information is carried in a message used to send an identifier of the terminal device in a random access process.

14. The network device according to claim 10, wherein, the second information is an identifier of a signal carried on the first downlink transmission beam received by the terminal device, and the signal carried on the first downlink transmission beam is at least one of following signals: a primary synchronization signal, a secondary synchronization signal, a broadcast signal, a reference signal, and a signal carrying a system message.

* * * * *